(12) United States Patent
Lee et al.

(10) Patent No.: US 10,597,073 B2
(45) Date of Patent: Mar. 24, 2020

(54) VEHICLES AND STEERING SYSTEMS FOR VEHICLES PROVIDING HAPTIC FEEDBACK

(71) Applicant: GM GLOBAL TECHNOLOGY OPERATIONS LLC, Detroit, MI (US)

(72) Inventors: Jin-Woo Lee, Rochester Hills, MI (US); Bakhtiar B. Litkouhi, Washington, MI (US); Chandra S. Namuduri, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 241 days.

(21) Appl. No.: 15/627,309

(22) Filed: Jun. 19, 2017

(65) Prior Publication Data

US 2018/0362075 A1 Dec. 20, 2018

(51) Int. Cl.
| | |
|---|---|
| *B62D 6/00* | (2006.01) |
| *B62D 3/12* | (2006.01) |
| *B62D 1/16* | (2006.01) |
| *B62D 5/04* | (2006.01) |
| *B62D 15/02* | (2006.01) |
| *B62D 5/00* | (2006.01) |
| *F16H 25/22* | (2006.01) |

(Continued)

(52) U.S. Cl.
CPC ............... *B62D 6/008* (2013.01); *B62D 1/16* (2013.01); *B62D 3/12* (2013.01); *B62D 5/003* (2013.01); *B62D 5/005* (2013.01); *B62D 5/006* (2013.01); *B62D 5/043* (2013.01); *B62D 5/0421* (2013.01); *B62D 15/0215* (2013.01); *F16D 37/02* (2013.01); *F16H 25/2015* (2013.01); *F16H 25/2204* (2013.01)

(58) Field of Classification Search
CPC .. B62D 6/008; B62D 1/16; B62D 3/12; B62D 5/003; B62D 5/005; B62D 5/006; B62D 5/0421; B62D 5/0423; B62D 5/0215; F16D 37/02; F16H 25/2015; F16H 25/2204
USPC ................................ 180/402, 443, 444, 446
See application file for complete search history.

(56) References Cited

U.S. PATENT DOCUMENTS 6,547,043 B2 * 4/2003 Card ...................... B62D 7/224
188/267.2
6,659,218 B2 * 12/2003 Thomas ............ B60R 25/02147
180/402

(Continued)

*Primary Examiner* — Jacob D Knutson
(74) *Attorney, Agent, or Firm* — Lorenz & Kopf, LLP

(57) ABSTRACT

Vehicles and steering systems for vehicles are provided. An exemplary steering system is provided for an automotive vehicle that includes road wheels and a rack mechanically coupled to the road wheels and laterally displaceable to change an orientation of the road wheels. The steering system includes a steering wheel mounted on a steering column and rotatable by a driver for inputting a steering command. The steering system also includes a lower column coupled to the rack. In the steering system, lateral displacement of the rack causes a rotational torque on the lower column. The steering system further includes a magneto-rheological coupling interconnected between the steering column and the lower column. The magneto-rheological coupling selectively communicates a desired portion of the rotational torque on the lower column to the steering column to provide haptic feedback to the steering column.

16 Claims, 3 Drawing Sheets

(51) Int. Cl.
*F16H 25/20* (2006.01)
*F16D 37/02* (2006.01)

(56) References Cited

U.S. PATENT DOCUMENTS

| | | | |
|---|---|---|---|
| 7,077,027 B2* | 7/2006 | Krizan | B62D 1/16 |
| | | | 280/775 |
| 9,308,583 B2 | 4/2016 | El-Dasher et al. | |
| 10,239,552 B2* | 3/2019 | Bodtker | B62D 5/005 |
| 2003/0141835 A1* | 7/2003 | Zheng | B62D 5/0463 |
| | | | 318/434 |
| 2003/0146038 A1* | 8/2003 | Mills | B62D 5/001 |
| | | | 180/422 |
| 2004/0262071 A1* | 12/2004 | Duits | B62D 5/005 |
| | | | 180/402 |
| 2005/0288143 A1* | 12/2005 | Menjak | B62D 5/008 |
| | | | 475/29 |
| 2006/0213320 A1* | 9/2006 | Menjak | B62D 5/008 |
| | | | 74/640 |
| 2016/0129503 A1 | 5/2016 | El-Dasher et al. | |
| 2016/0243652 A1 | 8/2016 | El-Dasher et al. | |
| 2016/0347360 A1* | 12/2016 | Schnug | B62D 5/0472 |

* cited by examiner

VEHICLES AND STEERING SYSTEMS FOR VEHICLES PROVIDING HAPTIC FEEDBACK

INTRODUCTION

In a conventional automotive vehicle, steering is accomplished by adjusting the orientation of the front road wheels. The steering wheel is mechanically coupled to the road wheels through a rack and pinion mechanism wherein rotation of the steering wheel by the driver rotates a pinion to laterally displace a rack to change the orientation of the road wheels, i.e., pivot the road wheels left or right.

Systems that eliminate the mechanical coupling between the steering wheel and road wheels have been developed. For example, steer-by-wire systems typically do not include a mechanical connection between the steering wheel and road wheels. Rather, such systems typically utilize an electric motor to drive the pinion (in case of pinion-mounted electric power assist motor) or the rack (in case of rack mounted electric power assist motor) to displace the rack and change the road wheel orientation. Steering commands may be communicated from the steering wheel to the electric motor to direct displacement of the pinion or rack to change the road wheel orientation. Steering commands are typically inputted by a driver, or a control command in the case of automated steering, using a steering wheel similar to mechanical steering systems. Electrical sensors detect rotation of the steering wheel and provide a signal to a controller that actuates the electric motor to reorient the road wheels.

In a mechanical steering system, the driver experiences a steering feel, or haptic feedback, as a result of the mechanical linkage between the road wheels and the steering wheel. Steering feel facilitates proper control of the vehicle, thus it is desirable to provide such steering feel or haptic feedback in vehicles provided with steering systems in which the steering wheel is mechanically decoupled from the road wheels. Typically, steering feel may be provided in such systems through use of an electric motor that coupled to the steering column through various means, e.g., a belt and pulley mechanism in an exemplary case. In response to input of a steering command, the controller actuates the electric motor coupled to the steering wheel to apply an opposite torque to the steering column and thereby provide a feeling of resistance to the driver. The degree of resistance is determined by the controller based upon applicable steering parameters including vehicle speed, steering wheel angle, steering wheel turn rate, yaw rate, rack load, lateral acceleration, suspension measurements, vertical acceleration, and road type (if available), and is intended to provide a feel similar to mechanical steering systems. The motor is sized to generate torque to produce the desired steering feel. Typically, such motors are large and operate at currents of over about 50 A. Further, many systems provide a first primary motor and a second redundant motor as a backup to the first primary motor. Such motors and systems may not always be optimal.

Accordingly, it is desirable to provide vehicles and steering systems for vehicles that avoid use of large motors for providing haptic feedback to the steering wheel. Further, it is desirable to provide vehicles and steering systems for vehicles that provide fail-safe designs for steering operation. Furthermore, other desirable features and characteristics will become apparent from the subsequent detailed description and the appended claims, taken in conjunction with the accompanying drawings and the introduction.

SUMMARY

Vehicles and steering systems for vehicles are provided. An exemplary steering system is provided for an automotive vehicle that includes road wheels and a rack mechanically coupled to the road wheels and laterally displaceable to change an orientation of the road wheels. The steering system includes a steering wheel mounted on a steering column and rotatable for inputting a steering command. The steering system also includes a lower column coupled to the rack. In the steering system, lateral displacement of the rack causes a rotational torque on the lower column. The steering system further includes a magneto-rheological coupling interconnected between the steering column and the lower column. The magneto-rheological coupling selectively communicates a desired portion of the rotational torque on the lower column to the steering column to provide haptic feedback to the steering column.

An exemplary steering system further includes a haptic generator coupled to the steering column for applying an additional resistive torque thereto, to potentially modify the feel of the haptic feedback, in response to the steering command.

Another exemplary steering system also includes an angle sensor configured to measure an angle of the steering wheel to provide the steering command, and a motor coupled to the rack for laterally displacing the rack in response to the steering command. Such an embodiment may further include a road wheel sensor providing a road wheel signal indicative of a road wheel response to the steering command, and a haptic generator coupled to the steering column for applying an additional resistive torque thereto in response to the road wheel signal.

In certain embodiments, the exemplary steering system selectively operates in a steer-by-wire (SBW) mode, in which the magneto-rheological coupling provides haptic feedback to the steering column, or operates in manual or normal electric power steering (EPS) mode, in which the magneto-rheological coupling mechanically couples the steering column to the lower column to communicate a torque applied to the steering wheel to the rack.

Exemplary steering systems may further include a mechanical latch for selectively mechanically coupling the steering column to the lower column to communicate a torque applied to the steering wheel to the rack. For example, exemplary steering systems may further include a solenoid latch for selectively mechanically coupling the steering column to the lower column to communicate a torque applied to the steering wheel to the rack.

Also, certain embodiments of the steering system further include a mechanism for limiting rotation of the steering wheel to a maximum angular rotation. For example, such steering systems may include an endstop mechanism for limiting rotation of the steering wheel to a maximum angular rotation. An exemplary endstop mechanism may include a threaded ball screw axially aligned with the steering column, a ball nut rotatably coupled to the threaded ball screw for axial movement thereon, a first stopper mounted on a first end of the threaded ball screw to stop axial movement of the ball nut in a first direction, and a second stopper mounted on a second end of the threaded ball screw to stop axial movement of the ball nut in a second direction opposite the first direction.

Another embodiment provides a vehicle including a steering wheel connected to a steering column. Further, the vehicle includes road wheels connected to a lower column. Also, the vehicle includes a magneto-rheological coupling interconnected between the steering column and the lower column and configured to communicate a controlled portion of rotational torque from the lower column to the steering column to provide haptic feedback to a driver controlling the steering wheel.

An exemplary vehicle may further include a haptic generator coupled to the steering column for applying an additional resistive torque thereto in response to movement of the road wheels. Also, an exemplary vehicle may further include a road wheel sensor providing a road wheel signal indicative of a road wheel response to movement of the road wheels, and a haptic generator coupled to the steering column for applying an additional resistive torque thereto in response to the road wheel signal.

In certain embodiments, the vehicle also includes an angle sensor configured to measure an angle of the steering wheel to provide a steering command, and a motor coupled to the road wheels for moving the road wheels in response to the steering command.

In an exemplary embodiment of the vehicle, the magneto-rheological coupling selectively operates in a steer-by-wire (SBW) mode, in which the magneto-rheological coupling provides haptic feedback to the steering column, or operates in a manual mode or an electric power steering (EPS) mode, in which the magneto-rheological coupling mechanically couples the steering column to the lower column to communicate a torque applied to the steering wheel to the road wheels.

The exemplary vehicle may further include a mechanical latch for selectively mechanically coupling the steering column to the lower column to communicate a torque applied to the steering wheel to the road wheels. For example, the exemplary vehicle may further include a solenoid latch for selectively mechanically coupling the steering column to the lower column to communicate a torque applied to the steering wheel to the road wheels.

Also, the exemplary vehicle may include a mechanism for limiting rotation of the steering wheel to a maximum angular rotation. For example, the exemplary vehicle may include an endstop mechanism for limiting rotation of the steering wheel to a maximum angular rotation. An exemplary endstop mechanism may include a threaded ball screw axially aligned with the steering column, a ball nut rotatably coupled to the threaded ball screw for axial movement thereon, a first stopper mounted on a first end of the threaded ball screw to stop axial movement of the ball nut in a first direction, and a second stopper mounted on a second end of the threaded ball screw to stop axial movement of the ball nut in a second direction opposite the first direction.

In another embodiment, a steering system is provided for an automotive vehicle that includes road wheels and a rack mechanically coupled to the road wheels and laterally displaceable to change an orientation of the road wheels. The steering system includes a steering wheel mounted on a steering column and rotatable for inputting a steering command. The steering system also includes a lower column coupled to the rack. In the steering system, lateral displacement of the rack causes a rotational torque on the lower column. The lower column is selectively engaged with the steering column in a first operation mode to communicate a portion of the rotational torque on the lower column to the steering column to provide haptic feedback to the steering column. Further, the steering system includes a mechanical latch for selectively mechanically coupling the steering column to the lower column in a second operation mode to communicate a torque applied to the steering wheel to the rack.

Such a steering system may further include an angle sensor configured to measure an angle of the steering wheel to provide the steering command, a motor coupled to the rack for laterally displacing the rack in response to the steering command, a road wheel sensor for providing a road wheel signal indicative of road wheel movement in response to the lateral displacement of the rack, and a haptic generator coupled to the steering column for applying an additional resistive torque thereto in response to the road wheel signal.

BRIEF DESCRIPTION OF THE DRAWINGS

The present subject matter will hereinafter be described in conjunction with the following drawing figures, wherein like numerals denote like elements, and wherein.

DETAILED DESCRIPTION

Figure 1:
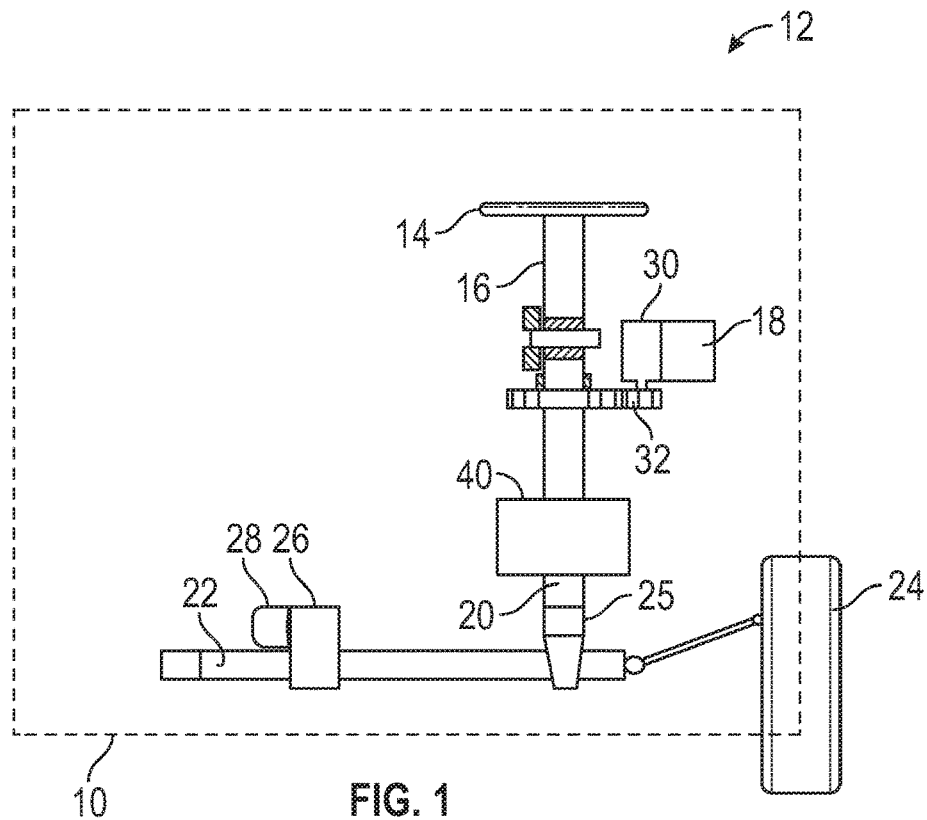
FIG. 1 is a schematic diagram of an automotive vehicle provided with a steering system in accordance with an embodiment herein.

The following detailed description is merely exemplary in nature and is not intended to limit the subject matter claimed herein. Furthermore, there is no intention to be bound by any theory presented in the preceding background or the following detailed description.

Embodiments herein provide steering systems that use a smaller motor for generating haptic feedback to a steering wheel as compared to conventional systems. For example, rather than relying on an electric motor to generate all torque for haptic feedback, exemplary steering systems herein may utilize a selective damping or coupling device to communicate a portion of rotational torque from a lower column in communication with the road wheels to a steering column in communication with the steering wheel. For example, a magneto-rheological device may be interconnected between the lower column and steering column to selectively communicate a desired portion of the rotational torque on the lower column to the steering column to provide haptic feedback to the steering column. A smaller electric motor may be utilized in addition to the selective damping or coupling device to generate the total haptic feedback on the steering wheel. In an exemplary embodiment, the total haptic feedback provides a driver with the desired steering feel. The combination of the selective device and the smaller electric motor may use 65% less electrical power than existing systems with a larger electric motor.

Further, embodiments herein provide for operation in a primary operation mode, such as a steer-by-wire (SBW) mode, in which the magneto-rheological device provides haptic feedback to the steering column, and for operation in a back-up operation mode, such as a manual mode or an electric power steering (EPS) mode, in which the lower column and steering column are mechanically connected such that haptic feedback is generated through conventional mechanical connection. The back-up operation mode may be performed by mechanically coupling the lower column and the steering column together via magnetic control of the selective damping or coupling device. As a further back-up in case that power to the selective damping or coupling device is interrupted, embodiments provided herein may include a mechanical latch to mechanically couple the lower column to the steering column. Such a mechanical latch may be used when a power supply is insufficient for operating the selective damping or coupling device or during electrical failure of the steering system.

Also, embodiments herein provide for limiting rotation of the steering wheel to a maximum angular rotation. In conventional mechanically-linked steering systems, movement of the road wheels themselves limit movement of the steering wheel. However, in steering systems in which the steering wheel is mechanically decoupled from the road wheels, physical rotation of the steering wheel is not limited by the inability to further rotate the road wheels. Exemplary embodiments herein include an endstop mechanism for limiting rotation of the steering wheel to a maximum angular rotation.

FIG. 1 is a schematic diagram illustrating an automotive vehicle 10 provided with a steering system 12 capable of selectively operating in a steer-by-wire (SBW) mode or in an electric power steering (EPS) mode. As shown, the vehicle 10 includes a steering wheel 14 mounted on a steering column 16 and rotatable by a driver for inputting a steering command. While steering commands are typically inputted by a driver, a control command may input steering commands in the case of automated steering. Further, the vehicle 10 includes an angle sensor 18 configured to measure an angle of the steering wheel 14. The angle sensor 18 may include a transceiver for communicating the angle of the steering wheel 14 as the steering command.

As further shown, the exemplary vehicle 10 includes a lower column 20 coupled to a rack 22 that is mechanically coupled to the road wheels 24 and that is laterally displaceable to change an orientation of the road wheels 24. The vehicle 10 may further include a road wheel sensor 25 that senses the orientation or angle and torque of the road wheels 24 and that may provide a road wheel signal indicative of a road wheel orientation and torque. The road wheel sensor 25 may include a transceiver for communicating the orientation and torque of the road wheels 24 as a signal in response to a steering command.

Also, the exemplary vehicle 10 includes a motor 26 coupled to the rack 22 for laterally displacing the rack 22 in response to the steering command. A controller 28 independent of, or integrated into, the motor 26 may be provided to receive the steering command signal from the angle sensor 18.

As further illustrated, the exemplary vehicle 10 includes an electric motor or haptic generator 30 that is mechanically coupled to the steering column 16 by a mechanism 32, such as a belt and pulley mechanism. An exemplary electric motor 30 includes a controller for receiving the road wheel signal from the road wheel sensor 25 and for directing the motor 30 to apply a torque to the steering column 16 indicative of a portion of the torque of the road wheels 24.

In FIG. 1, the steering column 16 is not mechanically coupled to the lower column 20. More specifically, a selective damping or coupling device 40 is interconnected between the steering column 16 and the lower column 20. During a primary operation mode, the selective damping or coupling device 40 does not mechanically couple the steering column 16 to the lower column 20. However, in a back-up operation mode, the selective damping or coupling device 40 may be operated to mechanically couple the steering column 16 to the lower column 20.

Figure 2:
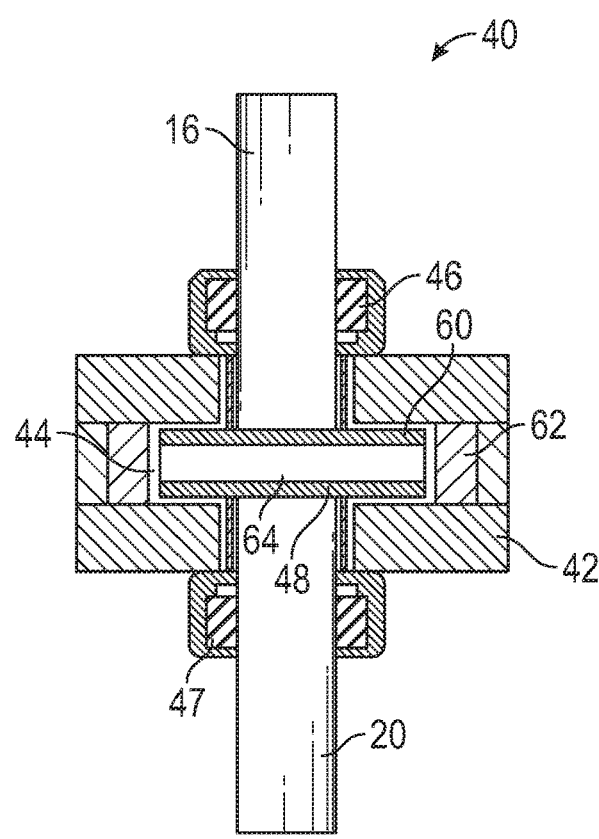
FIG. 2 is a schematic diagram illustrating a selective engagement between the steering column and the lower column of the steering system of FIG. 1 in accordance with an embodiment herein.

FIG. 2 illustrates the structure of the selective damping or coupling device 40. In an exemplary embodiment, the selective damping or coupling device 40 is a magneto-rheological device. As shown, the selective damping or coupling device 40 receives the steering column 16 and the lower column 20.

The selective damping or coupling device 40 includes a housing 42 disposed about and spaced radially from the steering column 16 and lower column 20. The housing 42 has a cavity 44 with axial open ends. An exemplary housing 42 is made of a ferrous material. The housing 42 may be mounted to a structure of the vehicle (not shown).

The selective damping or coupling device 40 includes a bearing 46 disposed about the steering column 16 at one open end of the housing 42 and a bearing 47 disposed about the lower column 20 at the other open end of the housing 42. Each bearing 46, 47 may be of a sealed roller type to allow rotation of the steering column 16 or lower column 20 relative to the housing 42.

The selective damping or coupling device 40 also includes a drive member 48 disposed within the cavity 44 of the housing 42 and fixed to the lower column 20. An exemplary drive member 48 is generally circular in shape. The exemplary drive member 48 is made of a ferrous material.

The selective damping or coupling device 40 also includes a driven member 60 disposed within the cavity 44 of the housing 42 and fixed to the steering column 16. An exemplary driven member 60 is generally circular in shape. The exemplary driven member 60 is made of a ferrous material.

The exemplary selective damping or coupling device 40 also includes a coil 62 disposed within the cavity 44 of the housing 42 and about the drive member 48 and the driven member 60. In an exemplary embodiment, the coil 62 is spaced a predetermined distance from the drive member 48 and driven member 60. The coil 62 may be connected by suitable means such as wires (not shown) to a current amplifier (not shown).

The selective damping or coupling device 40 further includes a magneto-rheological (MR) fluid 64 disposed in the cavity 44 of the housing 42 between the drive member 48 and driven member 60. An exemplary MR fluid 64 contains magnetizable particles such as carbonyl iron spheroids of from about one (1) to about ten (10) microns in diameter dispersed in a viscous fluid such as silicone oil, which has an apparent viscosity or yield stress of from about 20 Pascal to about 50,000 Pascal, depending on absence or presence of a magnetic field. It should be appreciated that the MR fluid 64 may also contain surfactants, flow modifiers, lubricants, viscosity enhancers, and other additives. It should also be appreciated that the MR fluid 64 is conventional and known in the art.

In operation of the selective damping or coupling device 40, an electronic controller included in the selective damping or coupling device 40 adjusts the current of the coil 62 of the selective damping or coupling device 40 based on an algorithm, which is programmed into the memory of the controller. The control algorithm for adjusting the current to the coil of the selective damping or coupling device 40 utilizes all or some of the information from vehicle dynamic inputs such as from the road wheel sensor 25 and the steering wheel sensor 18.

The electronic controller passes a current through the coil 62 to generate a magnetic field across the MR fluid 64 between the drive member 48 and the driven member 60. The strength of the magnetic field increases or decreases the apparent viscosity of the MR fluid 64 and thus increases or decreases the friction applied to the steering column 16 from rotational movement by the lower column 20. The apparent viscosity of the MR fluid 64 determines the amount of rotation of the steering column 16, thus varying the rotational torque communicated by the steering column 16 to the steering wheel 14. It should be appreciated that the amount of current passed through the coil 62 is programmable, thus affecting the strength of the magnetic field within and viscosity of the MR fluid 64. Though a single gap, parallel plate type MR fluid damping device is shown, other configurations such as multiple plate, multiple gap or cylindrical type MR fluid damping devices can be used.

Further, while the discussion above assumes a primary operation mode in which rotational torque of the lower column 20 is selectively communicated to the steering column 16, the selective damping or coupling device 40 may be utilized differently in a back-up operation mode. Specifically, in the back-up operation mode, apparent viscosity of the MR fluid 64 is selectively increased such that the drive member 48 and driven member 60 are effectively mechanically coupled. As a result, rotation of the steering wheel 14, steering column 16 and driven member 60 is directly communicated to the drive member 48 and lower column 20 to cause lateral displacement of the rack 22 and a change in orientation of the road wheels 24. Therefore, in such a back-up operation mode, the driven member 60 drives the drive member 48.

Figure 3:
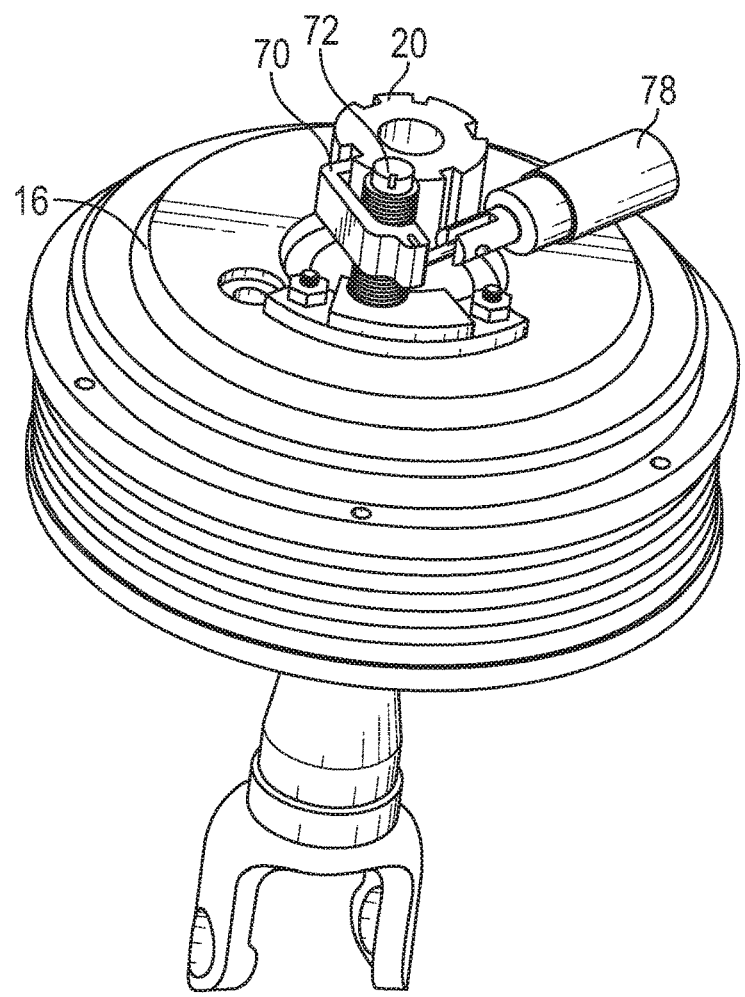
FIG. 3 is a perspective view of a mechanical latch for selectively mechanically coupling the steering column to the lower column of the steering system of FIG. 1 in accordance with an embodiment herein.
Figure 4:
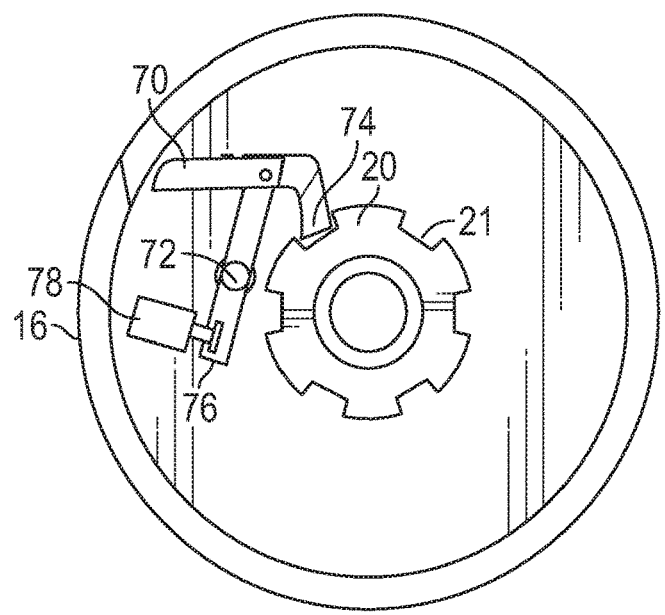
FIG. 4 is an overhead schematic of the mechanical latch of FIG. 3 in engagement with the steering column in accordance with an embodiment herein.

Referring now to FIGS. 3 and 4, a secondary back-up mechanism is provided for the steering system 12 of the vehicle 10 of FIG. 1. FIG. 3 illustrates a perspective view while FIG. 4 illustrates a top schematic view of a mechanical latch 70 for mechanically coupling the steering column 16 to the lower column 20. As shown, the latch 70 is pivotable about a pivot 72. The latch 70 includes an engagement end 74 and an opposite end 76. Further, actuator 78 is fixed to the end 76. An exemplary actuator 78 is a solenoid valve for extending and retracting to move the latch 70 about the pivot 72.

As shown in FIG. 3, the pivot 72 mounts the latch to the steering column 16. In FIG. 4, it may be seen that that the end 74 may be received in a groove 21 formed in the lower column 20. FIG. 4, illustrates the actuator 78 in a retracted and actuated configuration in which the end 74 of the latch 70 is driven into the groove 21 to mechanically engage the latch 70 (and steering column 16) to the lower column 20. The actuator 78 may be extended to remove the end 74 of the latch 70 from the groove 21 such that the latch 70 and steering column 16 are mechanically decoupled from the lower column 20.

The actuator 78 may be selectively operated to force mechanical engagement between the latch 70 (and steering column 16) and the lower column 20 when a power supply to the steering system is insufficient or during other electronic failure. For example, the actuator 78 may be biased toward a retracted configuration and a current supplied to the actuator 78 may keep the actuator 78 in an extended configuration. Cessation of the current to the actuator 78 may allow the actuator 78 to retract and force the latch into engagement with the groove 21 of the lower column 20. Of course, other structural arrangements and configurations may be utilized to selectively decouple and couple the latch 70 to the lower column 20.

Figure 5:
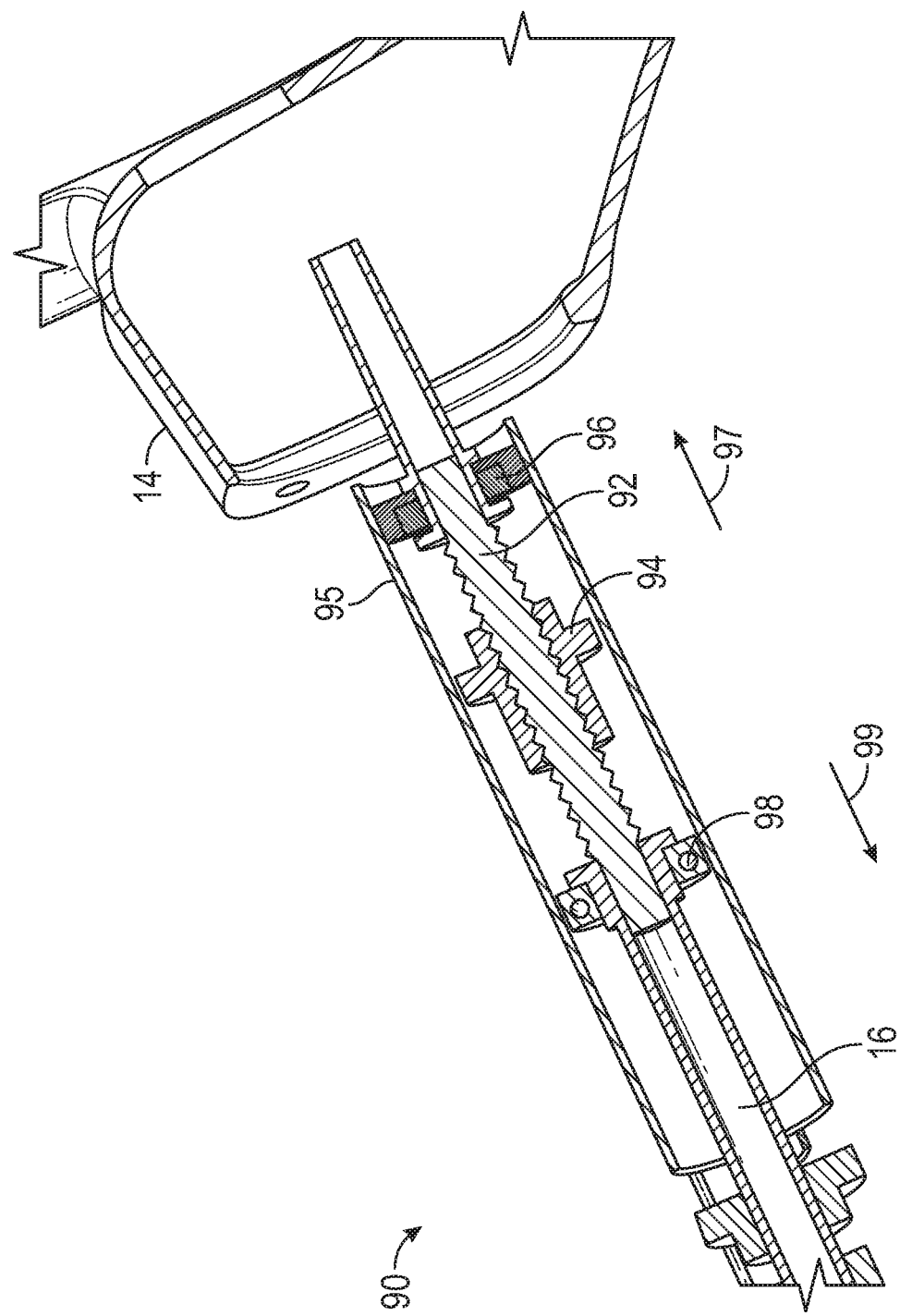
FIG. 5 is a cross sectional view of the steering column of FIG. 1 equipped with an endstop mechanism for limiting rotation of the steering wheel in accordance with an embodiment herein.

Referring now to FIG. 5, an endstop mechanism 90 for limiting rotation of the steering wheel 14 to a maximum angular rotation is illustrated and described. As shown, the endstop mechanism 90 is provided on the steering column 16. The exemplary endstop mechanism 90 includes a threaded ball screw 92 axially aligned with and fixed to the steering column 16. Further, the exemplary endstop mechanism 90 includes a ball nut 94 that is rotatably coupled to the threaded ball screw 92 for axial movement thereon. Specifically, the ball nut 94 has an inner surface that engages the threaded ball screw 92 and an outer surface that engages a fixed sleeve 95 such that rotation of the threaded ball screw 92 translated into axial movement of the ball nut 94. Also, the exemplary endstop mechanism 90 includes a first stopper 96 mounted on an end of the ball screw 92 to stop axial movement of the ball nut 94 in a first direction indicated by arrow 97. Further, the exemplary endstop mechanism 90 includes a second stopper 98 mounted on an end of the ball screw 92 to stop axial movement of the ball nut 94 in a second direction indicated by arrow 99.

When the ball nut 94 contacts the first stopper 96, further rotation of the ball screw 92 causing movement of the ball nut 94 in the direction of arrow 97 is inhibited. Likewise, when the ball nut 94 contacts the second stopper 98, further rotation of the ball screw 92 causing movement of the ball nut 94 in the direction of arrow 99 is inhibited. In this manner, the endstop mechanism 90 limits angular rotation of the steering wheel 14. For example, the endstop mechanism 90 may limit the steering wheel 14 to 300 degrees of rotation in either direction.

As described herein, vehicles are provided with steering systems that use a smaller motor for generating haptic feedback to a steering wheel as compared to conventional systems by utilizing a selective damping or coupling device to communicate a portion of rotational torque from a lower column in communication with the road wheels to a steering column in communication with the steering wheel. A smaller electric motor may be utilized in addition to the selective damping or coupling device to generate the total haptic feedback on the steering wheel, such as to provide the driver with the desired steering feel. Further, embodiments herein provide for operation in a primary operation mode, such as a steer-by-wire (SBW) mode, in which the selective damping or coupling device provides haptic feedback to the steering column, and for operation in a back-up operation mode, such as an electric power steering (EPS) mode, in which the lower column and steering column are mechanically connected such that haptic feedback is generated through conventional mechanical connection, such as by increasing resistance of the damping device to provide effective mechanical coupling. Another back-up mode provides for mechanically coupling the steering column and lower column via a mechanical latch. Also, embodiments herein provide for limiting rotation of the steering wheel to a maximum angular rotation through the exemplary endstop mechanism.

While at least one exemplary aspect has been presented in the foregoing detailed description, it should be appreciated that a vast number of variations exist. It should also be appreciated that the exemplary aspect or exemplary aspects are only examples, and are not intended to limit the scope, applicability, or configuration of the claimed subject matter in any way. Rather, the foregoing detailed description will provide those skilled in the art with a convenient road map for implementing an exemplary aspect of the subject matter. It being understood that various changes may be made in the function and arrangement of elements described in an exemplary aspect without departing from the scope of the subject matter as set forth in the appended claims.

What is claimed is:

1. A steering system for an automotive vehicle that includes road wheels and a rack mechanically coupled to the road wheels and laterally displaceable to change an orientation of the road wheels, the steering system comprising:
   a steering wheel mounted on a steering column and rotatable for inputting a steering command;
   a lower column coupled to the rack, wherein lateral displacement of the rack causes a rotational torque on the lower column;
   a magneto-rheological coupling interconnected between the steering column and the lower column, wherein the magneto-rheological coupling selectively communicates a desired portion of the rotational torque on the lower column to the steering column to provide haptic feedback to the steering column; and
   a latch for selectively mechanically coupling the steering column to the lower column to communicate a torque applied to the steering wheel to the rack.

2. The steering system of claim 1 further comprising a haptic generator coupled to the steering column for applying an additional resistive torque thereto in response to the steering command.

3. The steering system of claim 1 further comprising:
   an angle sensor configured to measure an angle of the steering wheel to provide the steering command; and
   a motor coupled to the rack for laterally displacing the rack in response to the steering command.

4. The steering system of claim 3 further comprising:
   a road wheel sensor providing a road wheel signal indicative of a road wheel response to the steering command; and
   a haptic generator coupled to the steering column for applying an additional resistive torque thereto in response to the road wheel signal.

5. The steering system of claim 1 wherein the steering system selectively operates in a steer-by-wire (SBW) mode, in which the magneto-rheological coupling provides haptic feedback to the steering column, and selectively operates in a manual mode or an electric power steering (EPS) mode, in which the magneto-rheological coupling mechanically couples the steering column to the lower column to communicate a torque applied to the steering wheel to the rack.

6. The steering system of claim 1 further comprising wherein the latch is a mechanical latch for selectively mechanically coupling the steering column to the lower column to communicate a torque applied to the steering wheel to the rack.

7. The steering system of claim 1 further comprising wherein the latch is a solenoid latch for selectively mechanically coupling the steering column to the lower column to communicate a torque applied to the steering wheel to the rack.

8. The steering system of claim 1 further comprising a mechanism for limiting rotation of the steering wheel to a maximum angular rotation.

9. The steering system of claim 1 further comprising an endstop mechanism for limiting rotation of the steering wheel to a maximum angular rotation comprising:
   a threaded ball screw axially aligned with the steering column;
   a ball nut rotatably coupled to the threaded ball screw for axial movement thereon;
   a first stopper mounted on a first end of the threaded ball screw to stop axial movement of the ball nut in a first direction; and
   a second stopper mounted on a second end of the threaded ball screw to stop axial movement of the ball nut in a second direction opposite the first direction.

10. A vehicle comprising:
    a steering wheel connected to a steering column;
    road wheels connected to a lower column;
    a magneto-rheological coupling interconnected between the steering column and the lower column and configured to communicate a controlled portion of rotational torque from the lower column to the steering column to provide haptic feedback to a driver controlling the steering wheel; and
    an endstop mechanism for limiting rotation of the steering wheel to a maximum angular rotation comprising:
    a threaded ball screw axially aligned with the steering column;
    a ball nut rotatably coupled to the threaded ball screw for axial movement thereon;
    a first stopper mounted on a first end of the threaded ball screw to stop axial movement of the ball nut in a first direction; and
    a second stopper mounted on a second end of the threaded ball screw to stop axial movement of the ball nut in a second direction opposite the first direction.

11. The vehicle of claim 10 further comprising a haptic generator coupled to the steering column for applying an additional resistive torque thereto in response to movement of the road wheels.

12. The vehicle of claim 10 further comprising:
    a road wheel sensor providing a road wheel signal indicative of a road wheel response to movement of the road wheels; and
    a haptic generator coupled to the steering column for applying an additional resistive torque thereto in response to the road wheel signal.

13. The vehicle of claim 10 further comprising:
    an angle sensor configured to measure an angle of the steering wheel to provide a steering command; and
    a motor coupled to the road wheels for moving the road wheels in response to the steering command.

14. The vehicle of claim 10 wherein the magneto-rheological coupling selectively operates in a steer-by-wire (SBW) mode, in which the magneto-rheological coupling provides haptic feedback to the steering column, or operates in a manual mode or an electric power steering (EPS) mode, in which the magneto-rheological coupling mechanically couples the steering column to the lower column to communicate a torque applied to the steering wheel to the road wheels.

15. The vehicle of claim 10 further comprising a mechanical latch for selectively mechanically coupling the steering column to the lower column to communicate a torque applied to the steering wheel to the road wheels.

16. The vehicle of claim 10 further comprising a solenoid latch for selectively mechanically coupling the steering column to the lower column to communicate a torque applied to the steering wheel to the road wheels.

* * * * *